United States Patent
Hokkirigawa et al.

(10) Patent No.: US 6,787,075 B2
(45) Date of Patent: Sep. 7, 2004

(54) METHOD OF MAKING SYNTHETIC RESIN COMPOSITION WITH LUBRICATIVE UNDERWATER PROPERTIES CONTAINING RBC OR CRBC FINE POWDER

(75) Inventors: Kazuo Hokkirigawa, Sendai (JP); Rikuro Obara, Miyota-Machi (JP)

(73) Assignee: Minebea Co., Ltd., Miyota-machi (JP)

( * ) Notice: Subject to any disclaimer, the term of this patent is extended or adjusted under 35 U.S.C. 154(b) by 0 days.

(21) Appl. No.: 10/376,580

(22) Filed: Feb. 28, 2003

(65) Prior Publication Data

US 2003/0183973 A1 Oct. 2, 2003

(30) Foreign Application Priority Data

| Mar. 1, 2002 | (JP) | 2002-055307 |
|---|---|---|
| Mar. 1, 2002 | (JP) | 2002-055308 |
| Mar. 7, 2002 | (JP) | 2002-062406 |
| Mar. 7, 2002 | (JP) | 2002-062412 |
| Jun. 17, 2002 | (JP) | 2002-176436 |
| Sep. 18, 2002 | (JP) | 2002-272147 |

(51) Int. Cl.[7] .......... B29B 9/02; B29B 11/02; B29B 11/14; B29B 13/10; B29C 35/00
(52) U.S. Cl. ............. 264/29.4; 264/29.5; 264/29.7; 264/115; 264/118; 264/119; 264/120; 264/122; 264/125
(58) Field of Search .............. 264/29.4, 29.5, 264/29.7, 109, 115, 118, 119, 120, 122, 125

(56) References Cited

U.S. PATENT DOCUMENTS

| 5,236,784 A | 8/1993 | Kobayashi et al. |
| 5,549,394 A | 8/1996 | Nowak et al. |
| 5,697,709 A | 12/1997 | Mori et al. |
| 5,879,791 A | 3/1999 | Kato et al. |
| 5,916,499 A | * 6/1999 | Murayama et al. ........ 264/29.1 |
| 6,033,118 A | 3/2000 | Asai et al. |
| 6,395,677 B1 | * 5/2002 | Hokkirigawa et al. ...... 502/402 |
| 6,573,215 B2 | * 6/2003 | Hokkirigawa et al. ...... 502/402 |
| 2002/0114548 A1 | 8/2002 | Hokkirigawa |
| 2002/0114549 A1 | 8/2002 | Hokkirigawa |

OTHER PUBLICATIONS

Kino Zairyo (Functional Materials), May 1997, vol. 17, No. 5, pp. 24–28.

* cited by examiner

Primary Examiner—Stephen J. Lechert, Jr.
(74) Attorney, Agent, or Firm—James A. Quinton

(57) ABSTRACT

A method of making a low friction bearing for use when immersed in a liquid particularly water is provided comprising a synthetic resin composition which includes powders of a rice bran ceramic, carbon rice bran ceramic or both which are uniformly dispersed in a synthetic resin. The weight ratio between the RBC or CRBC powders and the synthetic resin is 30:90 to 70:10.

19 Claims, No Drawings

METHOD OF MAKING SYNTHETIC RESIN COMPOSITION WITH LUBRICATIVE UNDERWATER PROPERTIES CONTAINING RBC OR CRBC FINE POWDER

BACKGROUND OF THE INVENTION

1. Field of the Invention

The present invention relates to a synthetic resin composition having good lubricating properties when immersed in a liquid particularly water and a method of manufacturing a bearing having a low coefficient of friction underwater.

2. Description of Related Art

Conventionally, bearings for pumps which are used in a liquid such as a water are shielded to prevent the liquid from entering into the bearings. Shieldless bearings have also been used. However, prior art materials for shieldless bearings have not exhibited desired low friction characteristics when immersed in water or other liquids.

As much as 900,000 tons/year and 33,000,000 tons/year of rice bran is produced and wasted in Japan and in the world, respectively. Attempts have been made to find uses for this material. Rice bran has employed to produce a porous carbon composition. (cf. "Kinou Zairyou (Function & Materials)", Vol. 17, No. 5, pp. 24–28, May 1997); and U.S. Pat. No. 5,916,499.

The Function & Materials article teaches a RB ceramic composition (hereinafter referred to as RBC) and its production method. A RBC is a carbon composition. Defatted rice bran and a thermosetting resin were mixed and kneaded together, and then molded under pressure. The molded composition is dried. The dried molded composition is sintered under an inert atmosphere to produce the carbon composition. Here, any thermosetting resin can be used in the process as long as it has thermosetting properties. Typical examples of such thermosetting resins include phenol resins, diarylphthalate resins, unsaturated polyester resins, epoxy resins, polyimide resins and triazine resins. Phenol resins are preferably used. A mixing ratio between defatted rice bran and a thermosetting resin is 50:50 to 90:10 by weight, preferably 75:25.

A sintering temperature is 700° C.~1,000° C., and a rotary kiln is usually employed. The sintering duration is approximately 40 to 120 minutes.

The RB ceramic composition-can be further improved to furnish a carbon composition called a CRB ceramic composition (hereinafter referred to as CRBC). Defatted rice bran is prepared from rice bran. Defatted rice bran and a thermosetting resin produce a RB ceramic composition as described above. The sintered RBC composition is crushed into carbonized powder with particle sizes of no larger than approximately 100 mesh. The carbonized powder and a thermosetting resin are mixed, kneaded and molded under pressure of 20 MPa~30 MPa. Then, the molded composition is again thermally treated at 500° C.~1,100° C. under an inert atmosphere to produce a black resin or porous ceramic composition, which is CRBC.

SUMMARY OF THE INVENTION

According to the invention, a synthetic resin composition for making bearings having a desirable a low coefficient of friction when submersed in a liquid is provided. In addition, a method of making a low friction bearing for use under liquid is provided as well as a low friction bearing for use under liquid.

According to the invention, a synthetic resin composition with lubricative underwater properties is provided. The resin is useful for making articles that desirably exhibit a low coefficient of friction under liquid particularly underwater. A powder preferably a fine powder of a RBC, CRBC or both are uniformly dispersed in a synthetic resin. Desirably the weight ratio between RBC or CRBC powders and the synthetic resin is 30:90 to 70:10.

In another aspect of the invention, a method of making a bearing having a low coefficient of friction and having lubricity when immersed in liquid is provided. A rice bran ceramic (RBC) fine powder is formed by mixing defatted rise bran with a thermosetting resin. The rice bran and the thermosetting resin are molded under pressure to form a first molded composition. The molded composition is then dried and sintered and crushed into a fine powder. A bearing is then formed by mixing the RBC fine powder with a synthetic resin preferably a thermoplastic resin under sufficient heat to form a homogeneous mixture having plasticity.

Alternatively RBC is used to form a carbon rice brand ceramic (CRBC) fine powder. RBC powder is mixed with a thermosetting resin, molded, sintered and crushed to a fine powder CRBC. The CRBC fine powder or both the CRBC fine powder and the RBC fine powder are mixed with a synthetic resin preferably a thermoplastic resin under sufficient heat to form a homogeneous mixture having plasticity. A bearing is then fabricated for example by molding the homogeneous mixture. As a result a bearing is provided having a low coefficient of friction when submersed under a liquid preferably underwater.

The preferred embodiment of the present invention is illustrated in the drawings and examples. However, it should be expressly, understood that the present invention should not be limited solely to the illustrative embodiment.

DETAILED DESCRIPTION OF THE INVENTION

RBC and CRBC have excellent characteristics for use as a material for use in fabricating bearings. RBC and CRBC exhibit high hardness, irregular particle shapes when they are made into powder, a very small expansion coefficient, porous composition structure and electrically conductive. They are light weight, have a low specific weight and exhibit a very low friction coefficient and excellent abrasion resistance. Moreover, use of RBC and CRBC has little adverse effects on the global environment and contributes to the conservation of resources because they are made from rice bran.

According to the invention, a synthetic resin composition having lubricative under liquid properties is provided for use as a material for fabricating bearings which have a low coefficient of friction when immersed in a liquid particularly underwater. Desirably the bearings made according to the invention have a low coefficient of friction in water, alcohol, ethylene glycol, and mixtures thereof preferably in water. In another aspect of the invention, a method of making a low friction bearing having good sliding properties under liquid preferably underwater is provided as well as a low friction bearing having a low coefficient of friction under liquid preferably for use underwater.

According to the invention, a synthetic resin composition with lubricative under liquid preferably lubricative underwater properties is provided. A powder, preferably a fine powder of a RBC, CRBC or both are uniformly dispersed in a synthetic resin preferably a thermoplastic resin. Desirably the weight ratio between the powder of RBC or CRBC and the synthetic resin is 30:90 to 70:10. A variety of synthetic resins can be employed in the present invention. Preferably the resin is a thermoplastic resins desirably polyamide, polyester or polyolefin resins.

Desirable thermoplastic resins for use in the invention such as nylon-66 (polyhexamethyleneadipamide), nylon-6 (polycapramide), nylon-11(polyundecaneamide), nylon-12, polyacetal, polybutyleneterephthalate, polyethyleneterephthalate, polypropylene, polyethylene, and/or polyphenylenesulfide, preferably Nylon-66. A single thermoplastic resin can be used, optionally two or more thermoplastic resins can be mixed and employed.

According to the invention, a thermosetting resin also can be included in the composition in an amount up to approximately 20% by weight of the entire composition. Thermosetting resins include for example phenol resins, diarylphthalate resins, unsaturated polyester resins, epoxy resins, polyimide resins and triazine resins.

In another aspect of the invention, a method of making a bearing having a low coefficient of friction under liquid preferably underwater and having lubricity when immersed in liquid is provided. A rice bran ceramic (RBC) fine powder is formed by mixing defatted rise bran with a thermosetting resin. The rice bran and the thermosetting setting resin are molded under pressure to form a molded composition. The molded composition is then dried and sintered and crushed into a fine powder. The RBC fine powder is mixed with a synthetic resin preferably a thermoplastic resin under sufficient heat to form a homogeneous mixture having plasticity. A bearing is then fabricated for example by molding the homogeneous mixture. As a result a bearing is provided having a low coefficient of friction when submersed under a liquid preferably under water.

Alternatively RBC is used to form a carbon rice brand ceramic (CRBC) fine powder. RBC powder is mixed with a thermosetting resin molded, sintered and crushed to a fine powder CRBC. The CRBC fine powder or both the CRBC fine powder and the RBC fine powder are mixed with a synthetic resin preferably a thermoplastic resin under sufficient heat to form a homogeneous mixture having plasticity. A bearing is then fabricated for example by molding from the homogeneous mixture. As a result a bearing is provided having a low coefficient of friction and exhibiting lubricity when submersed under a liquid preferably underwater.

According to the invention, the average particle diameter of fine powder of RBC or CRBC is desirably 300 µm or less. Preferably, an average particle diameter of 10 to 100 µm is used and more preferably an average particle diameter of 10 to 50 µm is used.

The bearings according to the invention are molded from the synthetic resin composition prepared as described above. Molding is preferably performed using extrusion or injection molding; It is desired that relatively low mold temperature be employed. Generally, a temperature in the vicinity of a glass transition point or melting point of the synthetic resin is desirable. Moreover, gradual cooling of the mold is desired to obtain molded pieces with better friction characteristics than rapid cooling.

The synthetic resin composition according to the invention has a variety of uses. For example, it can be used as a general bearing material including for bearings used in an underwater pump. Such use takes advantage of its low friction and abrasion characteristics. In addition, due to its excellent electrical conductivity, the resin composition can be used for applications such as a key cap. Because of its excellent dispersion characteristics, various other types of molded pieces can be made with the synthetic resin composition containing fine powder of a RBC or CRBC as well.

EXAMPLES

The present invention is described in further detail below based on Examples.

Example 1

Production of RBC Fine Powder

Defatted rice bran 750 g which was obtained from rice bran and a liquid phenol resin (resol) 250 g were mixed and kneaded while they were heated at 50~60° C. to provide a homogenous mixture with plasticity.

The mixture was fired at 900° C. for 100 minutes under a nitrogen atmosphere using a rotary kiln. The resultant carbonized sintered mixture was pulverized using a pulverizer, and subsequently filtered through a 150-mesh sieve to furnish RBC fine powder with an average particle diameter of 140~160 µm.

Preparation of a Mixture of the RBC Fine Powder and a Synthetic Resin

The resultant RBC fine powder 500 g and nylon-66 powder 500 g were mixed and kneaded while they were heated at 240~290° C. to furnish a homogenous mixture with plasticity. Here, a RBC fine powder content was 50% in weight.

Preparation of a Test Piece

The resin composition which was obtained through melting and mixing of the RBC fine powder and nylon-66 was injection-molded to prepare test pieces.

Example 2

Using the same method as that in Example 1, RBC fine powder with an average particle diameter of 140~160 µm was obtained.

Preparation of a Mixture of the RFC Fine Powder and a Synthetic Resin

The resultant RBC fine powder 700 g and nylon-66 powder 300 g were mixed and kneaded while they were heated at 240~290° C. to furnish a homogenous mixture with plasticity. Here, a RBC fine powder content was 70% in weight.

Preparation of a Test Piece

The resin composition which was obtained through melting and mixing of the RBC fine powder and nylon-66 was injection-molded to prepare test pieces.

Example 3

Production of RBC Fine Powder

Defatted rice bran 750 g which was obtained from rice bran and a liquid phenol resin (resol) 250 g were mixed and kneaded while they were heated at 50~60° C. to provide a homogenous mixture with plasticity.

The mixture was fired at 1,000° C. for 100 minutes under a nitrogen atmosphere using a rotary kiln. The resultant carbonized sintered mixture was pulverized using a pulverizer, and subsequently filtered through a 400-mesh sieve to furnish RBC fine powder with an average particle diameter of 40~50 µm.

Preparation of a Mixture of the RBC Fine Powder and a Synthetic Resin

The resultant RBC fine powder 700 g and nylon-66 powder 300 g were mixed and kneaded while they were heated at 240~290° C. to furnish a homogenous mixture with plasticity. Here, a RBC fine powder content was 70% in weight.

Preparation of a Test Piece

The resin composition which was obtained through melting and mixing of the RBC fine powder and nylon-66 was injection-molded to prepare test pieces.

Example 4

Production of CRBC Fine Powder

Defatted rice bran 750 g which was obtained from rice bran and a liquid phenol resin (resol) 250 g were mixed and kneaded while they were heated at 50~60° C. to furnish a homogenous mixture with plasticity.

The mixture was fired at 900° C. for 60 minutes under a nitrogen atmosphere using a rotary kiln. The resultant carbonized sintered mixture was pulverized using a pulverizer, and subsequently filtered through a 200-mesh sieve to furnish RBC fine powder with an average particle diameter of 100~120 μm.

The resultant RBC fine powder 750 g and a solid phenol resin (resol) 500 g were mixed and kneaded while they were heated at 100~150° C. to furnish a homogenous mixture with plasticity.

Next, the plastic material was molded into a sphere with a diameter of approximately 1 cm under a pressure of 22 MPa. The temperature of the mold was 150° C.

The molded piece was taken out of the mold, was heated to 500° C. at a heating rate of 1° C./minute in a nitrogen atmosphere. The temperature was maintained at 500° C. for 60 minutes and the molded piece was sintered at 900° C. for approximately 120 minutes.

Next, the temperature was lowered at a cooling rate of 2~3° C./minute to 500° C. When the temperature reached 500° C. or less, the sintered sphere was allowed to cool.

The resultant CRBC molded piece was pulverized using a pulverizer, and subsequently filtered through a 500-mesh sieve to furnish CRBC fine powder with an average particle diameter of 20~30 μm.

Preparation of a Mixture of the CRBC Fine Powder and a Synthetic Resin

The resultant CRBC fine powder 500 g and nylon-66 powder 500 g were mixed and kneaded while they were heated at 240~290° C. to furnish a homogenous mixture with plasticity. Here, a CRBC fine powder content was 50% in weight.

Preparation of a Test Piece

The resin composition which was obtained through melting and mixing of the CRBC fine powder and nylon-66 was injection-molded to prepare test pieces.

Examples 5~9 and Comparison Example 1

Using the same RBC or CRBC fine powder was those which were employed in Examples 1~3 and using similar methods, test pieces were prepared under conditions which are shown in Table 1.

Further, a Comparison Test was conducted using a commercially available PPS resin (manufactured by Idemitsu Petrochemical, Inc.) for an underwater pump.

TABLE 1

|  | Composition 5 | Composition 6 | Composition 7 | Composition 8 | Composition 9 | Comparison Example |
|---|---|---|---|---|---|---|
| RBC or CRB fine powder | One employed in Example 4 | One employed in Example 3 | One employed in Example 1 | One employed in Example 2 | One employed in Example 2 | — |
| Synthetic resin | Nylon 66 | PBT | PP | PPS | Nylon 66 | PPS |
| Fine powder: resin (weight ratio) | 70:30 | 50:50 | 70:30 | 50:50 | 30:70 | — |

PBT: polybutyleneterephthalate
PP: polypropylene
PPS: polyphenylenesulfide

Characteristics of the synthetic resin compositions with lubricative underwater properties which were obtained in Examples 1~9 are summarized in Table 2.

TABLE 2

|  | Tensile strength (MPa) | Bending strength (MPa) | Bending elasticity (GPa) | Specific resistance (ohm-cm) | Specific weight |
|---|---|---|---|---|---|
| Composition of Example 1 | 64.6 | 98.6 | 6.12 | 4.9E+01 | 1.35 |
| Composition of Example 2 | 61.4 | 97.6 | 6.14 | 3.2E+01 | 1.38 |
| Composition of Example 3 | 76.5 | 120 | 8.85 | 2.1E+01 | 1.43 |
| Composition of Example 4 | 75.9 | 117 | 8.56 | 3.4E+01 | 1.38 |
| Composition of Example 5 | 58.2 | 105 | 4.12 | 3.3E+01 | 1.27 |
| Composition of Example 6 | 49.6 | 72.3 | 7.5 | 3.3E+01 | 1.46 |
| Composition of Example 7 | 22.7 | 44.3 | 6.5 | 3.8E+01 | 1.32 |
| Composition of Example 8 | 79.2 | 121 | 7.6 | 4.0E+01 | 1.48 |
| Composition of Example 9 | 57.3 | 101 | 4.3 | 2.7E+01 | 1.24 |
| PPS of Comparison Example | 159 | 235 | 14.1 | 1.0E+16 | 1.75 |

Underwater friction characteristics of the synthetic resin compositions with lubricative underwater properties which were obtained in Examples 1~9 are summarized in Table 3.

TABLE 3

| | Example 1 | Example 2 | Example 3 | Example 4 | Example 5 | Example 6 | Example 7 | Example 8 | Example 9 | Comparison Example |
|---|---|---|---|---|---|---|---|---|---|---|
| Friction coefficient $\mu$ | | | | | | | | | | |
| A | 0.063 | 0.082 | 0.103 | 0.088 | 0.124 | 0.105 | 0.091 | 0.082 | 0.081 | 0.219 |
| B | 0.063 | 0.078 | 0.091 | 0.092 | 0.120 | 0.097 | 0.091 | 0.081 | 0.078 | 0.219 |
| C | 0.059 | 0.084 | 0.081 | 0.078 | 0.118 | 0.100 | 0.088 | 0.077 | 0.078 | 0.213 |
| D | 0.096 | 0.104 | 0.108 | 0.078 | 0.110 | 0.091 | 0.089 | 0.082 | 0.090 | 0.250 |
| E | 0.050 | 0.076 | 0.096 | 0.067 | 0.086 | 0.088 | 0.075 | 0.065 | 0.050 | 0.121 |
| F | 0.062 | 0.085 | 0.080 | 0.061 | 0.081 | 0.092 | 0.075 | 0.069 | 0.068 | 0.123 |

A: Measured under a condition of a sliding speed of 0.001 (m·s$^{-1}$)
B: Measured under a condition of a sliding speed of 0.005 (m·s$^{-1}$)
C: Measured under a condition of a sliding speed of 0.01 (m·s$^{-1}$)
D: Measured under a condition of a sliding speed of 0.1 (m·s$^{-1}$)
E: Measured under a condition of a sliding speed of 0.5 (m·s$^{-1}$)
F: Measured under a condition of a sliding speed of 1 (m·s$^{-1}$)

Advantages of the Present Invention

As is obvious from the results in Table 3, the synthetic resin compositions with lubricative underwater properties of the present invention comprising RBC or CRBC fine powder and a synthetic resin exhibit excellent underwater friction properties. They are as materials with which to make a bearing which comes in direct contact with a liquid such as a shieldless bearing with a sleeve bearing structure for a pump which is used in a liquid.

The foregoing is considered as illustrative only to the principles of the invention. Further, since numerous changes and modification will occur to those skilled in the art, it is not desired to limit the invention to the exact construction and operation shown and described above, and accordingly all suitable modifications and equivalents may be resorted to, falling within the scope of the invention.

What is claimed is:

1. A method of making a bearing having a low coefficient of friction and having lubricity when immersed in liquid comprising:
   a) forming a rice bran ceramic (RBC) fine powder by:
      i. mixing defatted rise bran with a first thermosetting resin;
      ii. molding said rice bran and said first thermosetting resin under pressure to form a first molded composition;
      iii. drying said first molded composition;
      iv. sintering said first molded composition;
      v. crushing the sintered first molded composition into a fine powder;
   b) forming said bearing by:
      i. mixing the RBC fine powder with a synthetic resin resin under sufficient heat to form a first homogeneous mixture having plasticity; or
      ii. forming a carbon rice brand ceramic (CRBC) fine powder by:
         mixing at least a portion of said RBC powder with a second thermosetting resin;
         molding said RBC powder and thermosetting resin to form a second molded composition;
         sintering said second molded composition;
         crushing said sintered second molded product to a fine powder CRBC;
         mixing the CRBC fine powder or both the CRBC fine powder and the RBC fine powder with a synthetic resin under sufficient heat to form a second homogeneous mixture having plasticity;
      iii. fabricating said bearing from said first or said second homogeneous mixture.

2. The method according to claim 1 wherein said RBC and said CRBC are uniformly dispersed in said synthetic resin.

3. The method according to claim 2 wherein said synthetic resin is a thermoplastic resin.

4. The method according to claim 3 wherein said thermoplastic resin is nylon-66 (polyhexamethyleneadipamide), nylon-6 (polycapramide), nylon-11 (polyundecaneamide), nylon-12, polyacetal, polybutyleneterephthalate, polyethyleneterephthalate, polypropylene, polyethylene, or polyphenylenesulfide.

5. The method according to claim 4 wherein said thermoplastic resin is a mixture of two or more resins.

6. The method according to claim 4 wherein said thermoplastic resin is nylon-66.

7. The method according to claim 1 further comprising mixing a thermosetting resin with said synthetic resin and said RBC or CRBC in an amount of 20% or less by weight of said first or second homogenous mixture.

8. The method according to claim 3 wherein the weight ratio of RBC fine powder, CRBC fine powder or both to synthetic resin is 30:70 to 90:10.

9. The method according to claim 8 wherein said RBC fine powder and the CRBC powder have a particle size of 300 $\mu$m or less.

10. The method according to claim 9 wherein said RBC fine powder and the CRBC powder have a particle size of 100 $\mu$m or less.

11. The method according to claim 10 wherein said RBC fine powder and the CRBC powder have a particle size of between 10 $\mu$m and 100 $\mu$m.

12. The method according to claim 11 wherein said RBC fine powder and the CRBC powder have a particle size of between 10 $\mu$m and 50 $\mu$m.

13. The method according to claim 1 wherein said first and second thermosetting resin are selected from the group of phenol resins, diarylphthalate resins, unsaturated polyester resins, epoxy resins, polyimide resins and triazine resins.

14. The method according to claim 9 wherein said bearing is fabricated by molding said first or second homogeneous mixture.

15. The method according to claim 9 wherein said bearing is fabricated by injection molding said first or second homogeneous mixture.

16. The method according to claim 9 wherein said bearing is fabricated by extruding said first or second homogeneous mixture.

17. The method according to claim 14, 15 or 16 wherein said bearing is molded at about the transition temperature of said first or second homogeneous mixture.

18. The method according to claim 3 wherein the liquid is water, alcohol, ethylene glycol, or a mixture thereof.

19. The method according to claim 18 wherein the liquid is water.

* * * * *